T. OLSEN.
MACHINE FOR TESTING HARDNESS.
APPLICATION FILED AUG. 20, 1909.

1,141,881.

Patented June 1, 1915.
2 SHEETS—SHEET 1.

Witnesses.
William H. Rivois.
Wills A. Burrowes.

Inventor.
Tinius Olsen.
by his Attorneys.
Howson & Howson

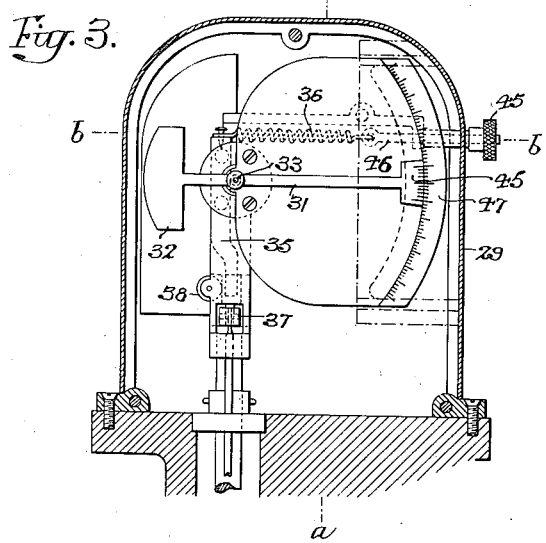

UNITED STATES PATENT OFFICE.

TINIUS OLSEN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

MACHINE FOR TESTING HARDNESS.

1,141,881.   Specification of Letters Patent.   Patented June 1, 1915.

Application filed August 20, 1909. Serial No. 513,855.

*To all whom it may concern:*

Be it known that I, TINIUS OLSEN, a citizen of the United States, residing in Philadelphia, Pennsylvania, have invented certain Improvements in Machines for Testing Hardness, of which the following is a specification.

My invention relates to machines particularly designed for testing the hardness of various materials, and one object of the present invention is to provide a novel device whereby the weight or load of such a machine as that above noted, may be quickly applied to or removed from its operative position in order to permit of the insertion or removal of the piece tested.

I further desire to provide a novel form of indicating mechanism for use in machines for testing the hardness of materials, and particularly in those machines in which the hardness is measured or determined by the distance to which a hard ball or other suitable body is pressed into the piece under test.

These objects and other advantageous ends I secure as hereinafter set forth, reference being had to the accompanying drawings, in which:—

Figure 2:
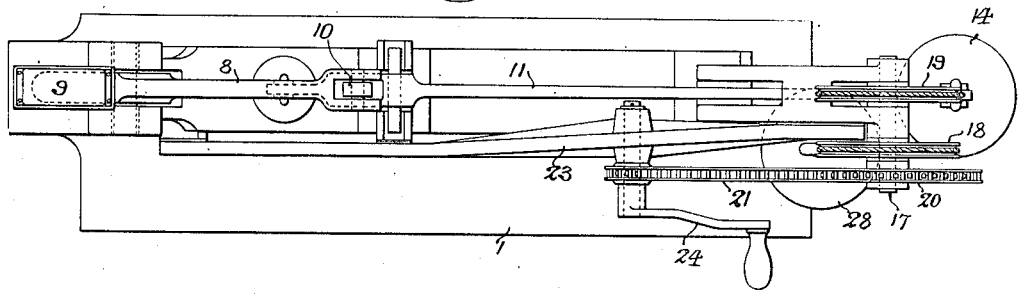
Figure 1:
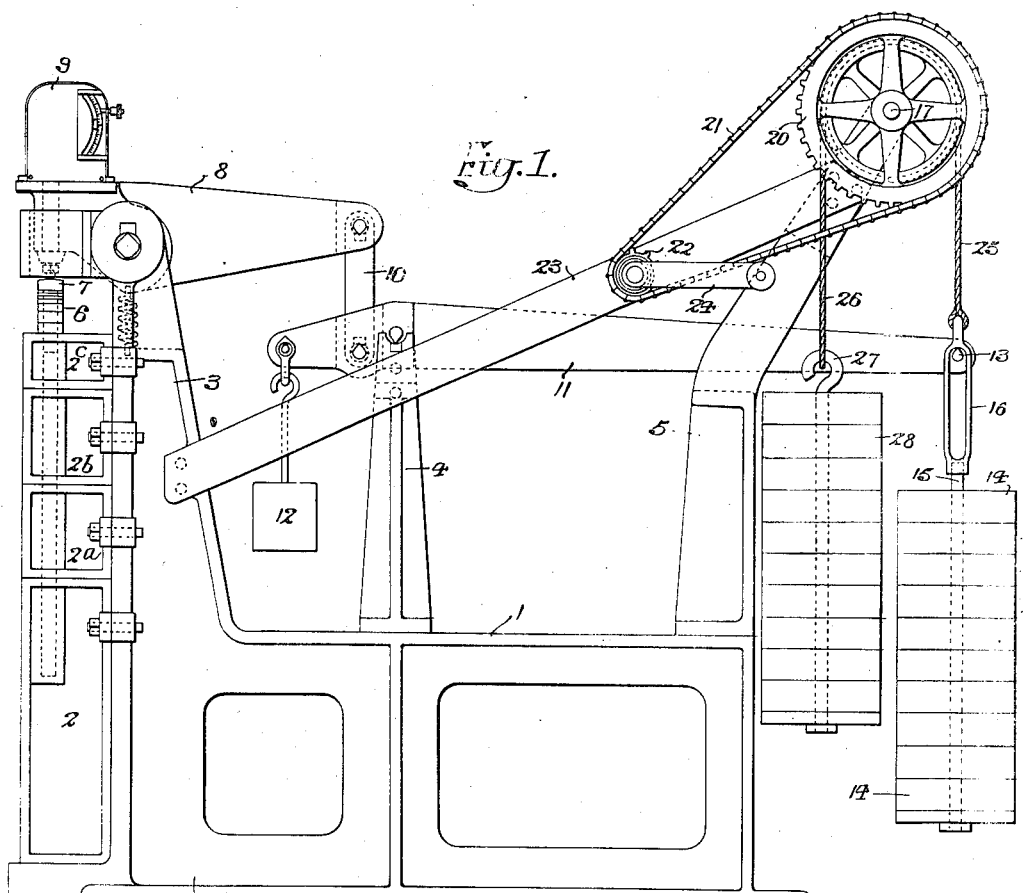

Figure 1, is a side elevation of a testing machine constructed according to my invention; Fig. 2, is a plan of the machine shown in Fig. 1; Fig. 3, is an enlarged side elevation of the indicating mechanism for the machine; Figs. 4 and 5, are respectively a vertical and a horizontal section taken on the lines *a—a* and *b—b*, Fig. 3; and, Fig. 6, is a vertical section of that portion of the indicating apparatus which engages directly with the piece under test.

In the above drawings, 1 is the frame of the machine, to one end of which are detachably connected the parts 2, 2ᵃ, 2ᵇ and 2ᶜ of a sectional support for pieces under test; there being on said frame three upwardly projecting standards 3, 4 and 5 for the support of the various levers, etc. On the uppermost of the sectional supports is a block 6 carrying an anvil 7, both of which may be mounted on any one of the support sections which are normally held to the standard 3 by suitable bolts. The upper part of the standard 3 is forked and provided with bearings for the support of a lever 8, which carries the indicating apparatus 9 hereafter described and has one arm connected by means of a link 10 with one arm of a second lever 11. Said latter lever is mounted by means of suitable knife-edged bearings on the standard 4, and its short arm, to which is attached the link 10, has suspended from it a counter weight 12. The extreme end of its other arm is provided with knife-edges to which are applied the weights employed in operating the machine. These weights, indicated at 14, are preferably disk shaped, and are removably mounted one upon the other on a rod 15 whose upper end is attached to a longitudinally slotted yoke piece 16. This latter is hooked at its upper end. Said yoke piece is vertically divided so that the end of the lever 11 may, under certain conditions, move between its slotted branches, and I provide suitable bearings in the upper ends of the slots in said branches for coöperation with the knife edges carried by said lever 11.

The standard 5 carries a horizontal spindle 17 on which are fixed two grooved pulley wheels 18 and 19, together with a sprocket wheel 20. This latter is connected by means of a chain with a second and smaller sprocket 22, mounted upon a short spindle carried by an inclined bar 23 which forms a tie or tension member. This latter spindle has connected to it an operating handle 24 whereby the sprocket wheel 20 and therefore the two grooved wheels 18 and 19 may be turned at will. A cable 25 connects the upper hook on the upper end of the yoke 16 with the pulley wheel 19 on which it is wound for a portion of a revolution, and a similar cable 26 is wound on the grooved wheel 18 to which one end of it is attached, while its other end has suspended from it a hooked rod 27 carrying a series of counterbalance weights 28. Under operating conditions these weights and also the weights 14 may be varied so that the total masses hung from the cables 25 and 26 are practically equal.

By turning the handle 24, it is comparatively easy to raise or lower either of the sets of weights and thereby either raise the weights 28 to such an extent as to permit the weights 14 to be supported solely by the lever 11, or on the other hand, to lower the weights 28 so that the bearings in the yoke piece 16 are raised out of engagement with the knife edge 13, thereby removing the load from said lever and permitting it, with the lever 8, to be moved up and down in order to permit of the removal or insertion of a piece to be tested.

The indicating apparatus of the machine is carried on the short arm of the lever 8 and includes a casing 29 provided with a glass window 30 through which may be observed the position of an indicating arm 31 and a scale 47. This arm is provided with a counterweight 32 and is mounted on a spindle 33 supported in suitable bearings.

The central part of the arm carries a small roller 34 against which rests a wooden bar 35 whose upper end is yieldingly drawn toward said roller by means of an adjustable spring 36, while its lower end is connected to a yoke piece 37 and guided by a roller 38 mounted in the framework 39 in which are carried the bearings for the spindle 33. The short arm of the lever 8 immediately under the yoke piece 37 is provided with a vertical passage through which extends a rod 40 to whose lower end is secured a head 41. Also extending through said passage on opposite sides of said rod are two small rods 42, the upper ends of both of which are connected to the yoke piece 37 while their lower ends extend to points usually on a level with the lowest portion of the surface of a ball 43 of hardened material, held to the head 41 by means of a cap 44.

In order to vary the pressure of the wooden bar 35 against the roller 34, I provide an adjustable nut 45 threaded on a bolt 46 attached to one end of the spring 36. Carried by the casing is the scale 47, formed concentrically with the center line of the spindle 33, which has a head 48 extending outside of said casing, so that since the roller 34 has frictional contact with the bar 35, the arm 31 may be adjusted at will. The end of said arm adjacent to the scale, is provided with a vernier 49, as shown in Fig. 3.

In using the machine, the hardened ball 43 is brought by suitable manipulation of the levers 7 and 8, into engagement with the piece to be tested, which presumably has a level surface for engagement with said ball; there being no load upon the lever 11, which is counterbalanced by the weight 12. The lower ends of the rods 42 also strike the test piece and should they happen to project below the lowest portion of said ball, will push up on the yoke piece 37 and rod 35, and, through the roller 34, turn the arm 31 from its zero position. By proper adjustment of the head 48 on the spindle 33 said arm may be moved so that the zero of its vernier coincides with the zero of the scale. If now a suitable weight is applied to the long arm of the lever 11, by operation of the handle 24 as above described, the ball 43 is pressed into or caused to indent the piece to be tested, which is mounted upon the anvil 7, and it is obvious that as said ball sinks into the material, the rods 42 are pressed upwardly, so that the arm 31 moves over the scale 37 to an amount which is dependent upon the depth to which the ball 43 is forced into said test piece.

Since the depth of the recess is directly proportional to the hardness of the material under test, the reading given on the scale may, by proper calibration, be made to directly indicate in suitable units the particular hardness of the piece being tested.

In order to remove the piece after testing, the handle 24 is so turned as to raise the weights 14 and thereby remove the bearings of the yoke 16 from engagement with the knife edge 13. The levers 11 and 8 are thereby freed so that the piece under test may be conveniently taken from the anvil and another substituted for it.

I claim:—

1. A testing machine including means for applying a load to a piece under test, the same consisting of a lever, a weight capable of operating on said lever to apply a load, and means for applying the weight to the lever or removing it therefrom consisting of a pulley, a flexible connection between said pulley and said weight, and a counter weight acting through said connection to raise the weight.

2. A testing machine including means for applying a load to a piece under test consisting of a lever; a member shaped to be capable of acting on said lever; an actuating weight and a counter weight operative on said member; and means operative at will for adjusting the member to cause the actuating weight to be applied to the lever.

3. A testing machine including means for applying a load to a piece to be tested, the same consisting of a lever, a shaft carried by the frame of the machine, two pulleys thereon, a weight hung from one pulley and capable of operating on the lever to actuate the machine, a second weight hung from the other pulley in position to counterbalance the first weight, and means for turning the shaft.

4. A testing machine including means for applying a load to a body under test, the same consisting of a lever having a knife edge, a slotted yoke having bearings capable of coöperating with said knife edge, a weight hung from said yoke, a shaft, two pulleys thereon, a cable wound on one pulley and connected to said yoke, a second cable wound in the opposite direction on the other pulley, a counterbalance weight attached to said second cable, a sprocket wheel on the shaft, a second sprocket wheel mounted on the frame of the machine, a chain connecting said sprocket wheels, and a handle for operating the second sprocket wheel.

5. The combination in a testing machine, of means for supporting a body under test, a member having a hard portion capable of engaging such body, means for applying a load to said member, a longitudinally movable bar, capable of engaging the body under test, a spindle having a roller engaged by said longitudinally movable bar, an indicating arm connected to the spindle, and a scale placed to coöperate with said arm.

6. The combination in a testing machine, of means for supporting a body under test, a member having a hard portion capable of engaging such body, means for applying a load to said member, a longitudinally movable bar capable of engaging the body under test, a spindle having a roller engaged by said longitudinally movable bar, an indicating arm connected with the spindle, and a scale placed to coöperate with said arm, with means for varying the pressure of the bar upon the roller.

In testimony whereof, I have signed my name to this specification in the presence of two subscribing witnesses.

TINIUS OLSEN.

Witnesses:
 WILLIAM E. BRADLEY,
 WM. A. BARR.